Aug. 23, 1927.
H. C. MILLER
1,640,283
METHOD OF FORMING STITCHED BUTTONHOLES
Filed Aug. 25, 1922      5 Sheets-Sheet 1
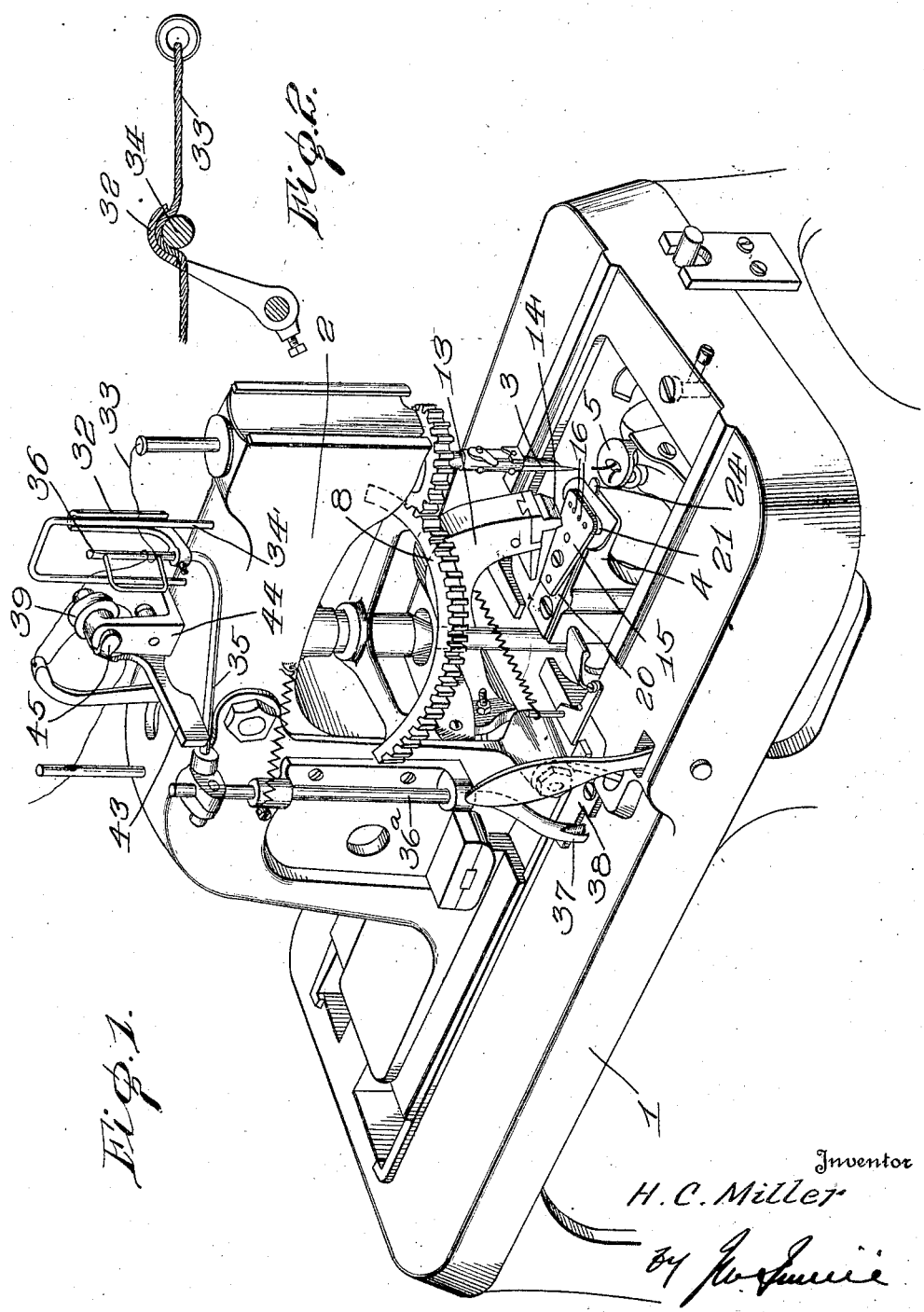
Inventor
H. C. Miller
By
Attorney Aug. 23, 1927.
H. C. MILLER
1,640,283
METHOD OF FORMING STITCHED BUTTONHOLES
Filed Aug. 25, 1922   5 Sheets-Sheet 2
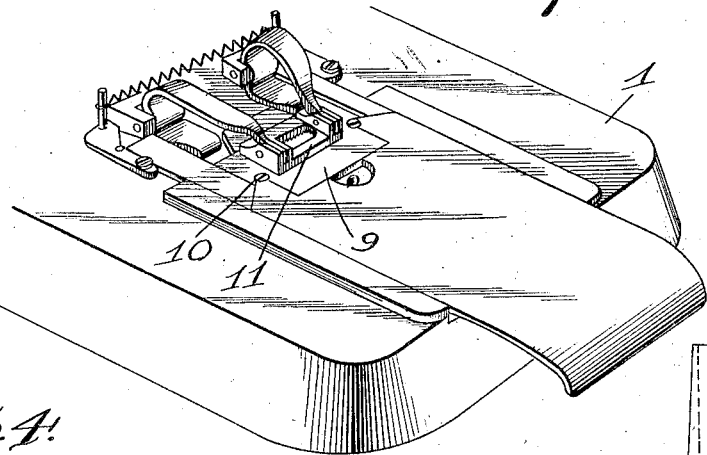
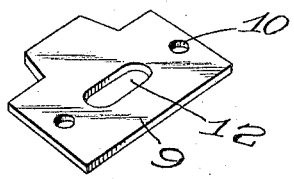
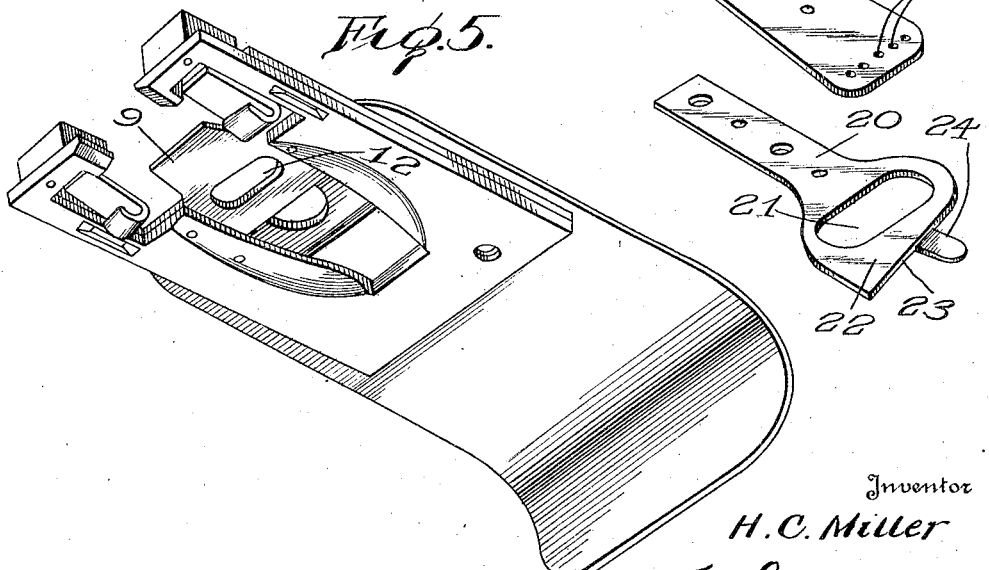
Inventor
H. C. Miller Aug. 23, 1927.
H. C. MILLER
1,640,283
METHOD OF FORMING STITCHED BUTTONHOLES
Filed Aug. 25, 1922     5 Sheets-Sheet 3
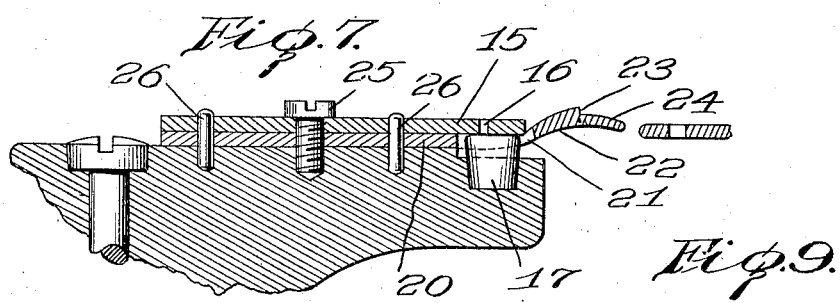
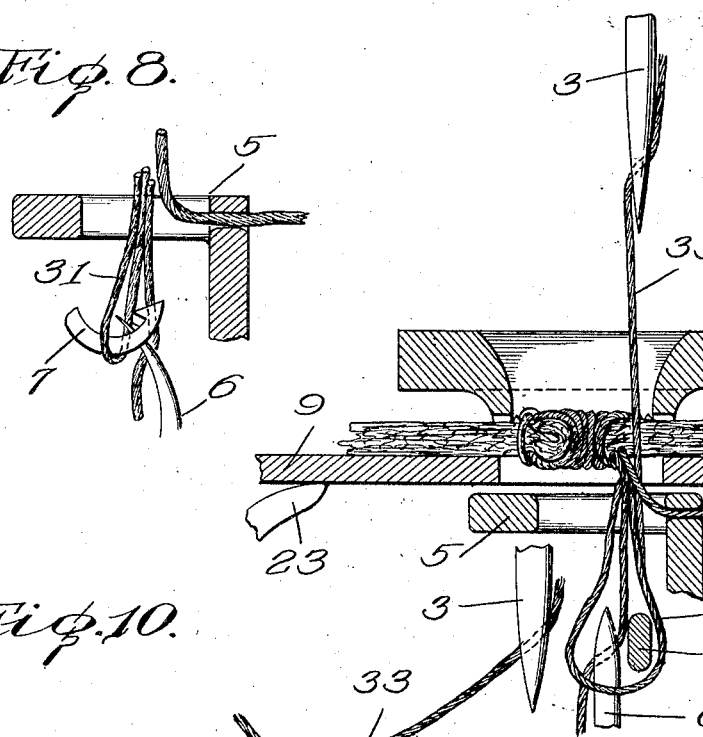
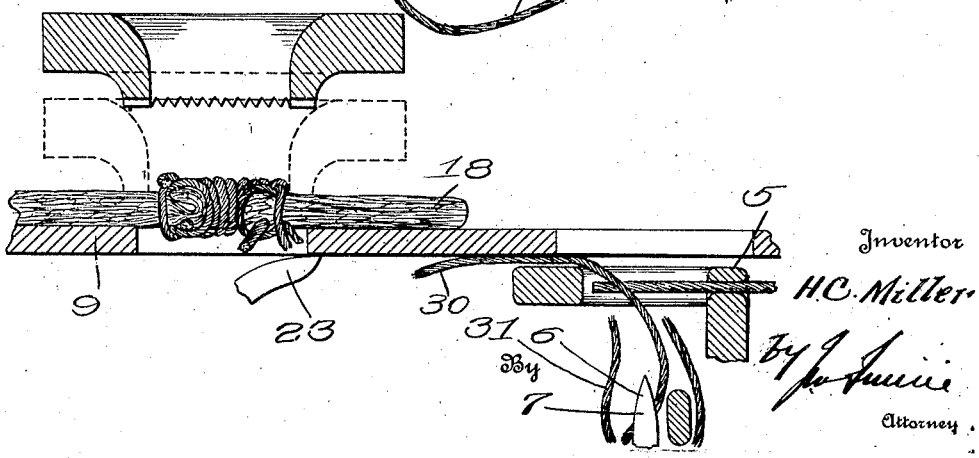
Inventor
H. C. Miller
By
Attorney Aug. 23, 1927.
H. C. MILLER
1,640,283
METHOD OF FORMING STITCHED BUTTONHOLES
Filed Aug. 25, 1922   5 Sheets-Sheet 4
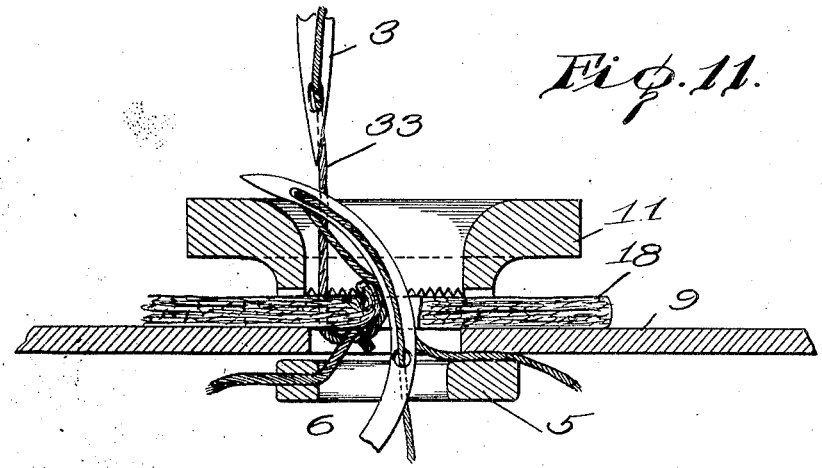
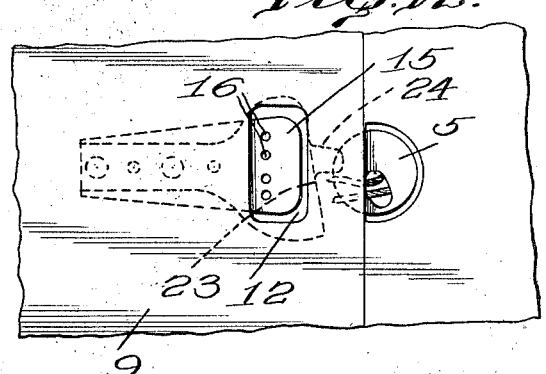
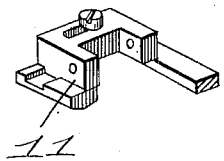
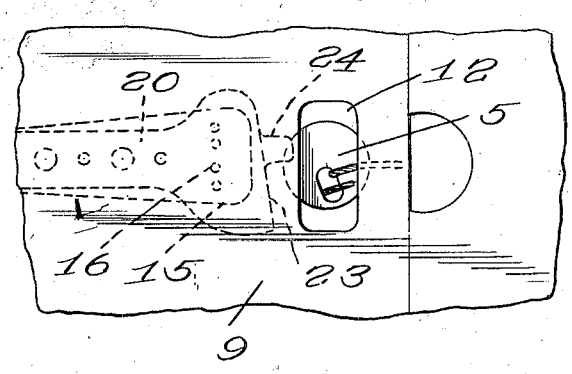
Inventor
H. C. Miller
By
Attorney

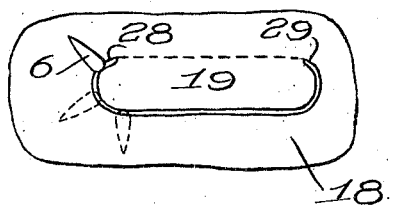
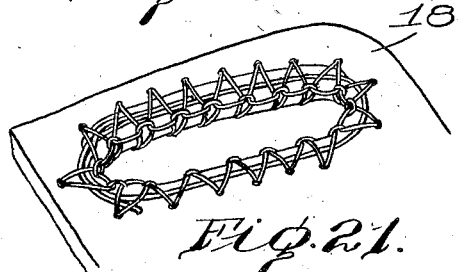
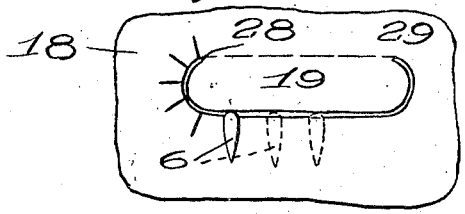
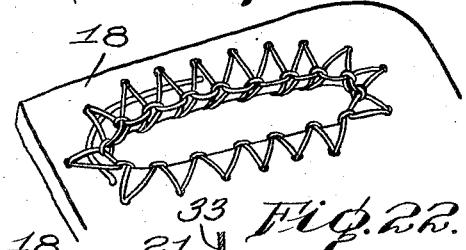
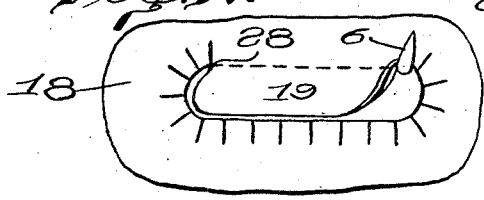
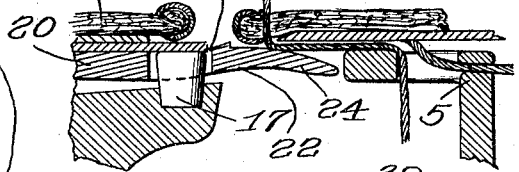
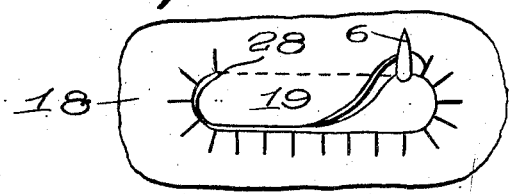
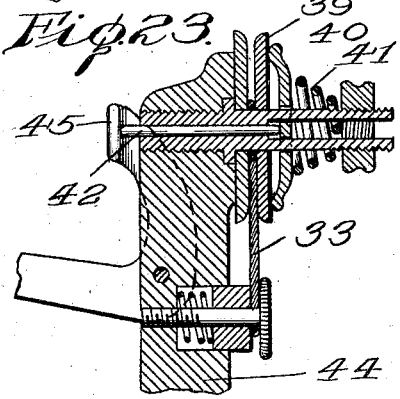
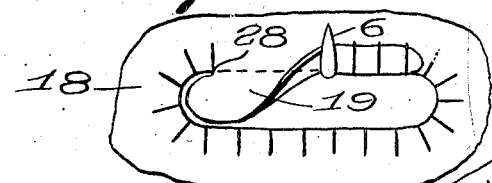

Patented Aug. 23, 1927.

1,640,283

UNITED STATES PATENT OFFICE.

HENRY C. MILLER, OF WATERFORD, NEW YORK.

METHOD OF FORMING STITCHED BUTTONHOLES.

Application filed August 25, 1922. Serial No. 584,323.

This invention relates to an improvement in buttonhole sewing machines designed more particularly for the formation and completion of button-holes of that type wherein a portion of the fabric is completely severed therefrom in the formation of the button-hole.

In machines heretofore employed for the formation of button-holes of this type it has been customary to provide a vacuum suction device to carry away the severed material, but in practice, particularly where the material is of more than one ply, it has been found that this method of eliminating the punchings or severed material is but partly successful with the result that some of the punchings of the different plies would be caught by the sewing mechanism and sewn in in the completion of the button-hole, which would result in defective button-holes.

The main object of the present invention is, therefore, the method and apparatus of forming button-holes of this type wherein the button-hole is formed by cutting through the fabrics for a portion of the outline of such button-hole, the cutting leaving a margin within the outline of the proposed button-hole which remains integral with the fabric. This margin is, during the stitching of the button-hole, automatically turned back onto the fabric, and held in such position by the over stitches, thereby providing a button-hole of the full desired opening, without the necessity of punching any of the material from the article in which the button-hole is being formed.

Another object of the present invention is the provision of an auxiliary anvil plate, on which the cutter or punch directly acts, this plate being adapted for ready removal when worn or imperfect and replacement by another, by the usual sewing-machine operator without requiring expert assistance. This auxiliary anvil plate, through its convenient replacement, when necessary, insures a perfect cutting operation of the punch at all times, and avoids the heretofore difficulty of properly surfacing the anvil face to insure a clean and perfect cut of the punch. Furthermore the auxiliary anvil plate is so formed that the punch will cut through the material throughout a predetermined length of the outline edge of the button-hole, but will not completely sever the remaining portion of such edge. This provides for the uncut margin adapted to be folded back in the stitching of the button-hole.

A further object of the present invention is the provision of means whereby the cloth plate is utilized as one edge of a shearing cutter for the severing of the threads, both upper and lower, and the stay cord, when latter is employed, the cooperating shearing cutter being formed by a trimmer functioning with the cloth plate in the operation of the machine.

The invention is illustrated in the accompanying drawings, in which:—

Figure 1 is a perspective view of a well-known type of sewing-machine, with the improvements hereinbefore referred to applied thereto, the cloth plate and clamp being omitted;

Figure 2 is a sectional detail of a thread check for the upper thread to prevent the same from springing out of the eye of the needle;

Figure 3 is a perspective view, showing the cloth plate and clamps in position;

Figure 4 is a perspective view of the cloth plate:

Figure 5 is a bottom perspective of Figure 3;

Figure 6 is a view illustrating the auxiliary anvil plate and trimmer in cooperative relation and also showing these parts separated;

Figure 7 is a sectional view illustrating the application of the auxiliary anvil plate and trimmer;

Figure 8 is a sectional view showing the relative positions of the upper and lower threads and stay cord in the throat plate of the revolving turret, when these threads and cord are in positions to be trimmed;

Figure 9 is a sectional view showing the clamp, cloth plate, fabric thereon, throat plate of the revolving turret, and stitching mechanism, with all parts in final positions ready for the trimming operation, the loop of the upper thread being somewhat enlarged for convenience in illustration;

Figure 10 is a view similar to Figure 9, with the parts in the positions occupied immediately succeeding the trimming operation;

Figure 11 is a sectional view illustrating the application of the initial stitch in stitching the button-hole;

Figure 12 is a plan showing the trimmer and superimposed auxiliary anvil plate in trimming position;

Figure 13 is a similar view with the trimmer and auxiliary anvil plate in position occupied during the stitching operation;

Figure 14 is a perspective of a detail;

Figure 15 is a plan illustrating more particularly the application of the initial stitch to the button-hole;

Figure 16 is a similar view showing the progressive stitching of the needle throughout the cut length of the button-hole edge;

Figure 17 is a similar view showing the initial position of the lower needle at the juncture of the margin and cut portion of the button-hole edge, the initial turning in of the margin by the needle being shown;

Figure 18 is a similar view showing the result of the continued stitching and laying in of the unsevered margin of material;

Figure 19 is a similar view illustrating the further action of the lower needle in connection with the uncut margin during the stitching operation;

Figures 20 and 21 show respectively the face and reverse side of the completed button hole;

Figure 22 is a sectional view illustrating the use of the guard finger of the trimmer;

Figure 23 is a sectional view showing the means for releasing the tension for the upper thread;

Figure 24 is a perspective view illustrating more particularly the action of the lower needle in folding back the fabric margin within the button-hole.

The improvements in method and apparatus contemplated by the present invention are shown as applied to a Reece type of sewing machine in which the cloth plate and cloth clamps are stationary and the stitching mechanism moves to and from a stitching position and is revolved and otherwise controlled to stitch around the edge of a particular button-hole. With the understanding that this type of machine is well known in the art, the parts thereof necessary to an understanding of the present invention will be merely referred to without specific description.

The improved machine comprises a bed 1 on which the arm 2 is slidably mounted. The upper sewing mechanism, including the upper needle 3 is carried by the arm while the lower sewing mechanism including a throat plate 5 at the upper end of the turret, the lower needle 6, the looper 7, and cooperating parts, is supported on parts integral with or otherwise appropriately connected to the traveling head or arm 2. Both the upper and lower sewing mechanism is rotatively reciprocated by the usual means indicated at 8.

The cloth plate 9 of the present invention is adapted to be removably secured at 10 to the bed plate of the machine, this cloth plate, together with the conventional or any preferred form of clamps 11, being thereby fixed with relation to the bed plate, so that the traveling arm and sewing mechanism carried thereby move with relation to this cloth plate and clamps. The cloth plate is formed with an opening 12 through which the fabric is cut, and through which the formed button-hole is subsequently stitched.

The punch arm 13, which is operated in the usual manner carries a punch 14, having an edge outline corresponding to the size of the button-hole to be cut. This punch has been heretofore arranged for cooperation with an anvil cutting block, and it has been ordinarily difficult to so arrange this punch and cutting surface so that the cut of the fabric will be completely clean at all times. To overcome this objection, I provide what may be termed an auxiliary anvil cutting plate 15, shown more particularly in Figure 6, which is secured to the underlying portion of the traveling arm support, and moves with the arm. This auxiliary anvil plate is a thin plate formed at the forward end, that is, in line with one cutting edge of the punch when the latter is depressed, with a series of perforations 16, the purpose of which will later appear.

As the punch operates through the fabric 18 held on the cloth plate by the clamps, the punch proper will cut cleanly through the plies of the fabric except throughout that margin of the proposed button-hole defined by the line of perforations 16. In the solid portion of the auxiliary anvil plate between these perforations, the punch, meeting this resistance of the plate, will cut the fabric, but as there is no plate resistance at each perforation, the fabric will not be cut at the perforations and hence the punch will leave a margin 19 connected with the fabric and disposed within the outline edge of the proposed button-hole, this margin 19 being connected by the uncut portions provided for in the arrangement of the perforations 16, as previously described.

It will be understood that the cloth plate 9 and clamps 11 remain stationary and that the sewing mechanisms, together with the auxiliary anvil plate, move with the arm. One of the objects of the present invention is to utilize one of the edges of the cloth plate as a shearing edge, for the severance of the threads below the fabric, and in order to so utilize this edge there is provided a trimmer 20 comprising a narrow plate-like section having an opening 21 therein of somewhat greater area than that of the opening 12 in the cloth plate, the forward edge portion of the trimmer being upturned at 22 and having a shearing edge 23, this edge 23 having a projecting finger 24.

The trimmer 20 is secured to the underlying moving support, immediately beneath the auxiliary anvil plate 15, both these plates being in fact secured in position by a single screw 25, and held against displacement by pins 26 projecting from the support and passing through openings in the anvil plate and trimmer. The trimmer underlies the anvil plate, but the upwardly turned forward portion 22 of the trimmer positions the shearing edge 23 of such trimmer, so that as the parts advance against the edge of the cloth plate, the threads below the fabric will be severed.

It is of course to be understood that the sewing mechanism is so operated as to follow the outline edge of the formed button-hole in the stitching of such button-hole. In this stitching operation the lower needle 6, which is curved in the usual form, moves upwardly in the slit in the fabric formed by the punch beyond the margin 19, the stitching starting at one corner juncture of such margin and slit, as at 28, Figure 15. The stitching continues, the lower needle rising through the slit beyond the margin, until it finally reaches the opposite corner edge 29. On the up stroke through this particular corner edge the needle will slightly displace the margin 19 and start to turn the same over, as clearly shown in Figure 17. As the stitching continues the movement of the lower needle gradually folds over this margin on the hinge connection provided by the partial cut formed through the use of the perforations 16, until when the stitching is completed, this margin 19 will be folded over onto the fabric beneath the over stitches and held, exposing the full area of the button-hole.

Following the completion of the stitching, the traveling arm and parts move forwardly or to the cutting and fabric releasing position shown in Figure 1. In this movement, the throat plate 5 moving with the turret of the lower stitching mechanism, draws out a sufficient length of lower thread, upper thread and stay cord if such is used, the movement continuing until the shearing edge 23 of the trimmer passes beneath and in cooperation with the shearing edge of the cloth plate, whereupon all of the threads are sheared close to the fabric and the fabric clamp released. As the parts start back to stitching position for operation on the next button-hole, the revolving turret causes the attached throat plate to move under the cloth plate and thereby hold the severed end of the lower thread therebetween, indicated at 30, Fig. 10 between the throat plate and cloth plate, holding such lower thread for the next initial stitching operation. Following the initial stitch, the unused end of the lower thread remains hanging below the fabric and is severed therefrom in the next trimming operation.

As will be clear from Figure 9, the upper thread is, at the trimming moment, held as a loop 31, around the looper 7. This loop, of course, is trimmed as an entirety, but to prevent it from being sewn in, by reason of its being held possibly as a loop after trimming, it is preferred to break this loop or at least tighten it immediately preceding the trimming operation, so that the severed loop is too short to sew in. For this purpose, there is provided in combination with an upper thread slacker, a thread holder indicated at 32, and comprising a half cylindrical member adapted to bind the upper thread 33 between it and a post 34 rising from the arm. This thread holder is connected to an arm 35 having an upright 36 to act upon the upper thread as a slackening means, the arm 35 being secured upon the upper end of a rod 36ª, rotatably mounted in bearings on the arm 2 and having an offset or crank end 37 to be controlled by a cam plate 38 on the bed plate. To permit effective slackening of the thread the tension of the upper thread is relieved in the movement of this rod, through the means illustrated in Figure 23. One of the tensioning disks 39 is held in tension position by a pressure disk 40 under the influence of a spring 41. A rod 42 is slidable through the bar on which the tension disks are mounted and adapted to engage the disk 40. A lever 43 is supported upon the tension device upright 44 and has a finger 45 to engage the end of the rod 42. The free end of the lever 43 overlies the arm 35 so that as the latter moves the lever will be elevated to relieve the spring pressure on the tension disk 39, and hence free the tension on the upper thread. As the traveling arm and associated parts move from stitching position toward what may be termed the trimming position, the rod 36 is rocked by the dog 38 and the upper thread is drawn upon to create a slack therein. At the same time the holder 32 clamps the thread on the post 34, and as the movement continues the loop of the upper thread is tightened or broken due to the pull on the thread. This causes the upper thread to appear as two ends below the fabric and when trimmed cannot possibly be stitched in with the succeeding stitching operation. As the traveling arm returns to stitching position the holder is released, the slackening device moves away from the thread, and there is thus provided a sufficient excessive length of upper thread to permit a proper stitching operation without pulling said upper thread from the needle in the initial stitches.

It is to be noted that, as illustrated in

Figure 22, the guard finger 24 of the trimming blade 20 acts to displace the cloth or fabric from the shearing line to avoid nipping the fabric in the shearing operation. The threads, however, readily ride past the guard finger and are necessarily engaged by the trimming edges.

From the above it will be apparent that the invention is particularly directed to a method of forming a button-hole, whereby the outline of the proposed button-hole is so punched or cut as to leave an integral margin of the fabric within said button-hole outline, which margin is automatically folded back onto the fabric beyond the button-hole outline by the stitching instrumentalities during the edge stitching of the button-hole. This folded back margin is not pierced by any of the threads in this stitching operation, but is laid in beneath the over stitches and securely held by them. Thus the laid in margin becomes imperceptible when the button-hole is finally completed. The invention also contemplates this particular type of button-hole, and also the mechanism by which it is formed. Furthermore the present invention provides a novel means for simultaneously shearing or cutting all threads close to the fabric during the normal movement of the stitching mechanisms from stitching to non-stitching position. This invention also comprehends an auxiliary anvil plate which is readily replaceable without requiring expert assistance or adjustment, with such auxiliary anvil plate, for the particular purposes of the present invention, formed to cause the punch to leave an integral margin of fabric within the outline of the proposed button-hole with the juncture between such margin and fabric proper so scored or divided as to form a hinge for the margin to insure its being folded back along a determined line which will maintain the proper outline of the completed button-hole. It is of course to be understood that in the type of machine described in connection with these improvements, the cloth plate and clamps remain stationary at all times and that the stitching mechanism as well as the trimmer and the auxiliary anvil plate move from what may be termed the cutting position to the stitching position. When the parts have moved to the cutting position, the clamps are automatically elevated to release the fabric, the trimming of the threads having taken place immediately preceding this clamp-lifting movement.

The edge stitching of the button-hole is accomplished in any usual or preferred manner, that is, in following the outline of the button-hole edge, as for example in moving the entire arm and connected parts in forming the side stitches and in revolving or rotating the stitching mechanism while making the end stitches, or as in other makes for making the same class of button-hole, the arm of the machine is at all times stationary, but the clamp moves while stitching the side stitches of the button-hole, but the turret revolves when stitching the end button-holes. The clamp fabric and plate could then be moved after the stitching of the button-hole would be completed. The means for differentiating the lengths of the stay cord and the lower needle threads is not shown in this application but is shown in prior applications, such for example as Serial Number 370536, filed April 1, 1920.

Having thus described the invention, what is claimed, is:—

1. The herein described method of forming stitched button-holes, consisting in cutting the fabric to leave a foldable margin within the proposed button-hole outline, and folding said margin onto the fabric in the stitching of the button-hole.

2. The herein described method of forming stitched button-holes, consisting in cutting the fabric to leave a foldable margin within the proposed button-hole outline, and folding said margin onto the fabric in the stitching of the button-hole and maintaining said folded relation by the stitches.

3. The herein described method of forming stitched button-holes, consisting in providing a foldable integral fabric margin within the button-hole outline, and folding said margin back onto the fabric and securing it in such position in and by the edge stitching for the button-hole.

4. The herein described method of forming stitched button-holes, consisting in cutting the fabric to divide the same on a button-hole edge outline except for a predetermined length of said edge outline, whereby to leave a fabric margin integral with one edge of the button-hole, and folding said fabric margin on to the fabric in a position beyond the button-hole edge outline in the stitching of such button-hole edge.

5. The herein described method of forming stitched button-holes, consisting in initially cutting the fabric in partial button-hole outline to leave a marginal fabric portion connected with that portion of the button-hole edge not cut, and subsequently folding such marginal portion onto the fabric beyond the button-hole during and by the stitching for completing the button-hole.

6. The herein described method of forming stitched button-holes, consisting in cutting the fabric in partial button-hole outline and thereby providing a marginal fabric portion within the button-hole and connected to one edge of such button-hole, and finally progressively folding the said marginal portion back onto the fabric beyond the button-hole by the stitching instrumentalities, the said margin being held in folded position onto the fabric by the stitches for the button-hole edge.

7. The herein described method for forming stitched gap button-holes without severing entirely any portion of the fabric therefrom, consisting in cutting through the fabric for a portion of the length of the button-hole edge outline to permit the fabric margin within the button-hole edge outline to remain integral with the non-cut edge of said button-hole, and folding said margin back onto the fabric during the stitching of the button-hole, the fold of the margin completing the edge outline of the button-hole.

8. The herein described method of forming stitched button-holes consisting in cutting the fabric to leave a foldable margin within the proposed button-hole outline, stitching the button-hole throughout the cut outline and utilizing the stitching instrumentalities to fold said margin onto the fabric beyond the button-hole, and securing said folded margin beneath the stitches.

9. A button-hole having the fabric portion normally included within its outline, folded back as an entirety onto the fabric beyond the button-hole.

10. A button-hole having the fabric portion normally included within its outline, folded back as an entirety onto the fabric beyond the button-hole, the folded portions being secured in place by the edge stitches for the button-hole.

11. The herein described method of forming stitched button-holes, consisting in cutting the fabric to leave a foldable margin within the proposed button-hole outline, and folding said margin onto the fabric in and by the stitching of the button-hole.

12. The herein described method of forming stitched button-holes, consisting in cutting the fabric to leave a foldable margin within the proposed button-hole outline, and automatically folding said margin onto the fabric in the stitching of the button-hole.

In testimony whereof I affix my signature.

HENRY C. MILLER.